(12) United States Patent
Takeshima

(10) Patent No.: US 6,395,854 B1
(45) Date of Patent: May 28, 2002

(54) METHOD FOR PRODUCING POLY (P-T-BUTOXYSTYRENE)

(75) Inventor: Hiroharu Takeshima, Minoo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/455,782

(22) Filed: Dec. 7, 1999

(30) Foreign Application Priority Data

Dec. 8, 1998 (JP) ............................................. 10-348397
Mar. 17, 1999 (JP) ............................................. 11-071808

(51) Int. Cl.$^7$ ............................................. C08F 112/06
(52) U.S. Cl. ................ 526/347.1; 526/173; 526/348.5; 526/348.6; 526/346
(58) Field of Search ............................ 526/173, 348.5, 526/348.6, 346, 347.1

(56) References Cited

U.S. PATENT DOCUMENTS 5,218,053 A * 6/1993 DuBois ........................ 525/285
5,352,564 A * 10/1994 Takeda et al. ............... 430/270
5,962,609 A * 10/1999 Haddleton et al. .......... 526/131

FOREIGN PATENT DOCUMENTS

| JP | 63036602 B2 |   | 7/1988 |
| JP | 2746053 | * | 2/1998 |
| JP | 2746053 B2 |   | 4/1998 |

* cited by examiner

Primary Examiner—David W. Wu
Assistant Examiner—William Cheung
(74) Attorney, Agent, or Firm—Birch, Stewart, Kolasch & Birch, LLP

(57) ABSTRACT

Disclosed is a method for producing poly(p-t-butoxystyrene) by polymerizing p-t-butoxystyrene using an organometallic compound as a polymerization initiator, wherein a mixed solvent comprising a hydrocarbon solvent and a diether of (poly)alkylene glycol is used as a solvent, and this method can provide the desired poly(p-t-butoxystyrene) efficiently and readily under relatively mild conditions.

7 Claims, No Drawings

METHOD FOR PRODUCING POLY (P-T-BUTOXYSTYRENE)

BACKGROUND OF THE INVENTION

The present invention relates to a method for producing poly(p-t-butoxystyrene). In more detail, the present invention relates to a method for producing poly(p-t-butoxystyrene) characterized in that a mixed solvent composed of a specific ether compound, a diether of (poly) alkylene glycol and a hydrocarbon solvent is used as a polymerization solvent.

Poly(p-t-butoxystyrene) has been well known as a variety of functional resins such as a resist material used for producing VLSIs. As an example of methods for its production, a method in which p-t-butoxystyrene is polymerized in a variety of solvents using an organometallic compound as a polymerization initiator has been known.

For instance, a method in which an organometallic compound, such as an alkyllithium and sodium naphthalene, is used as a polymerization initiator and a single solvent, such as an aromatic hydrocarbon, a cyclic ether and an aliphatic hydrocarbon, is used has been proposed in JP-B63-36602 and JP-A-6-123970.

This method, however, has an industrial drawback that it requires a polymerization facility in which polymerization is performed at ultra low temperatures of from −70 to −78° C., although it can afford a polymer with a relatively narrow molecular weight distribution.

In order to overcome the aforementioned drawback, for example, a method in which a mixed solvent composed of a hydrocarbon solvent and a polar solvent such as tetrahydrofuran, 1,4-dioxane, ethyl ether and N-methylpyrrolidine and sec-butyllithium as a polymerization initiator has been proposed in JP-A-6-298869.

This method, however, is not necessarily satisfactory in a rate of forming the target compound, etc. Therefore, there has been a demand for improving the method in this respect.

SUMMARY OF THE INVENTION

Under these circumstances, the present inventors have extensively studied on reaction solvents in order to improve the rate of forming the target compound, etc. As a result, they have found that the use of a mixed solvent composed of a specific ether compound, namely, a diether of (poly) alkylene glycol and a hydrocarbon solvent can remarkably improve the rate of forming the target compound and the like, and can provide the target compound efficiently. They have further conducted the study and accomplished the present invention.

The present invention provides an industrially advantageous method for producing poly(p-t-butoxystyrene) by polymerizing p-t-butoxystyrene in which an organometallic compound is used as a polymerization initiator and a mixed solvent comprising a hydrocarbon solvent and a diether of (poly)alkylene glycol is used as the polymerization solvent.

DESCRIPTION OF THE PREFERRED EMBODIMENTS

The present invention is characterized in that a mixed solvent composed of a hydrocarbon solvent and a diether of (poly)alkylene glycol is used as the polymerization solvent. Examples of the diether of (poly)alkylene glycol include compounds represented by the following formula:

$R_1(OR_2)_nOR_3$ wherein $R_1$ and $R_3$ represent a lower alkyl group, $R_2$ represents a lower alkylene group and n represents a number of from 1 to 5.

Examples of the lower alkyl group as $R_1$ or $R_3$ include methyl, ethyl, propyl, i-propyl, butyl, i-butyl and sec-butyl. Examples of the lower alkylene group as $R_2$ include ethylene, propylene, butylene and pentylene.

Representative compounds represented by the foregoing formula include diethers of alkylene glycols such as ethylene glycol dimethyl ether, ethylene glycol diethyl ether, ethylene glycol dipropyl ether, ethylene glycol dibutyl ether, ethylene glycol methyl ethyl ether, ethylene glycol methyl butyl ether, propylene glycol dimethyl ether, propylene glycol diethyl ether, propylene glycol dipropyl ether and propylene glycol dibutyl ether; and diethers of polyalkylene glycols such as diethylene glycol dimethyl ether, triethylene glycol dimethyl ether and tetraethylene glycol dimethyl ether.

The above exemplified compound can be used singly or in combination of two or more of them, as the diether of (poly)alkylene glycol.

Representative examples of the hydrocarbon solvent include aromatic hydrocarbons such as benzene, toluene and xylene, and aliphatic hydrocarbons such as hexane, heptane, cyclohexane and methylcyclohexane.

The above exemplified compound can be used singly or in combination of two or more of them, as the hydrocarbon solvent.

Examples of the preferred mixed solvent include hexane/ethylene glycol dimethyl ether, hexane/ethylene glycol diethyl ether, hexane/ethylene glycol dibutyl ether, and toluene/ethylene glycol dimethyl ether.

In the present invention, the diether of (poly)alkylene glycol is used preferably in the amount of from 0.05 to 10% by weight, more preferably in the amount of from 0.2 to 5% by weight, based on the hydrocarbon solvent. When the amount exceeds 10% by weight, side reactions such as a coupling reaction tend to occur. On the other hand, when the amount is less than 0.05% by weight, there is a tendency to cause reduction in yield due to decrease in reaction rate and side reactions such as chain transfer. In both cases, there is a tendency to get worse in molecular weight distribution, dispersion and the like.

The mixed solvent is usually used in the amount of from 5 to 20 times by weight based on p-t-butoxystyrene.

The organometallic compound used in the present invention as a polymerization initiator include, for example, organoalkaline metals. Examples of organoalkaline metals include organolithium compounds, such as n-butyllithium, sec-butyllithium, i-butyllithium, t-butyllithium, 2-methylbutyllithium and lithium naphthalene; and organosodium compounds, such as sodium naphthalene, sodium anthracene, sodium α-methylstyrene tetramer and sodium biphenyl. Among them, n-butyllithium and sec-butyllithium are preferably used.

Although the amount of the organometallic compound varies depending upon a molecular weight of the desired poly(p-t-butoxystyrene), usually about $10^{-5}$ to $10^{-3}$ mole per gram of the monomer, p-t-butoxystyrene is preferred.

The polymerization reaction is usually carried out in a high vacuum or under an inert gas atmosphere such as argon and nitrogen. The reaction temperature is usually from −50 to 0° C., preferably from −40 to 0° C., more preferably from −40 to −20° C. The reaction time usually ranges from 10 minutes to 20 hours.

The polymerization reaction can be terminated by addition of a small amount of a polymerization terminator such as water and methanol.

Subsequently, the reaction mixture is subjected to washing with water and removal of the organic solvent by distillation to isolate the desired poly(p-t-butoxystyrene). The resulting poly(p-t-butoxystyrene) can be purified by adding it into methanol or the like after the distillation of the organic solvent.

The molecular weight distribution can be calculated by determining a number average molecular weight (Mn) and a weight average molecular weight (Mw) in terms of polystyrene by GPC analysis. The peak pattern of the resulting GPC elution curve shows the degree of monodispersion.

According to the present invention, the desired poly(p-t-butoxystyrene) can be produced efficiently and readily under relatively mild conditions using a mixed solvent composed of a specific ether compound, namely, a diether of (poly) alkylene glycol and a hydrocarbon solvent as a polymerization solvent.

EXAMPLES

The following Examples will explain the present invention further in detail, but should not be construed to limit the invention.

Example 1

Under a nitrogen atmosphere, 300 ml of dehydrated hexane and 4.5 mmol of sec-butyllithium were charged into a 500 ml flask and cooled to −20° C. Into the mixture was dropwise added a mixed solution composed of 60 g of p-t-butoxystyrene monomers and 3 ml of ethylene glycol dimethyl ether over 15 minutes, and polymerization was conducted at −20° C. for 20 minutes. The reaction was then terminated by adding a small amount of methanol. Subsequent washing with water and removal of the solvent by distillation provided 60 g of a white solid product. Its GPC measurement revealed that it had a number average molecular weight in terms of polystyrene Mn of 5,776 and a sufficiently small molecular weight distribution Mw/Mn of 1.10. Its elution curve demonstrated that it was of monodispersion. The GC analysis of the product indicated that the amount of unreacted monomers was not more than the detection limit.

Example 2

Under a nitrogen atmosphere, 300 ml of dehydrated hexane and 30 g of p-t-butoxystyrene monomer were charged into a 500 ml flask, and 3 ml of ethylene glycol dimethyl ether and 6.84 mmol of n-butyllithium were further added. After polymerization conducted at −20° C. for 20 minutes, the reaction was terminated by adding methanol. Subsequent washing with water and removal of the solvent by distillation provided 30 g of a white solid product. Its GPC measurement revealed that it had a number average molecular weight in terms of polystyrene Mn of 5,566 and a sufficiently small molecular weight distribution Mw/Mn of 1.15. Its elution curve demonstrated that it was of monodispersion. The GC analysis of the product indicated that the amount of unreacted monomers was not more than the detection limit.

Example 3

Under a nitrogen atmosphere, 150 ml of dehydrated hexane and 30 g of p-t-butoxystyrene monomers were charged into a 500 ml flask, and 1.5 ml of ethylene glycol diethyl ether and 2.3 mmol of sec-butyllithium were further added. After polymerization conducted at −20° C. for 15 minutes, the reaction was terminated by adding methanol. Subsequent washing with water and removal of the solvent by distillation provided 29 g of a white solid product. Its GPC measurement revealed that it had a number average molecular weight in terms of polystyrene Mn of 18,564 and a sufficiently small molecular weight distribution Mw/Mn of 1.19. Its elution curve demonstrated that it was of monodispersion. The GC analysis of the product indicated that the amount of unreacted monomers was 2.3%.

Example 4

Under a nitrogen atmosphere, 300 ml of dehydrated hexane and 30 g of p-t-butoxystyrene monomers were charged into a 500 ml flask, and 3 ml of ethylene glycol dibutyl ether and 7.5 mmol of sec-butyllithium were further added. After polymerization conducted at −20° C. for 15 minutes, the reaction was terminated by adding methanol. Subsequent washing with water and removal of the solvent by distillation provided 30 g of a white solid product. Its GPC measurement revealed that it had a number average molecular weight in terms of polystyrene Mn of 4,632 and a sufficiently small molecular weight distribution Mw/Mn of 1.13. Its elution curve demonstrated that it was of monodispersion. The GC analysis of the product indicated that the amount of unreacted monomers was not more than the detection limit.

Comparative Example 1

Under a nitrogen atmosphere, 110 ml of dehydrated toluene, 1.1 ml of 1,4-dioxane and 11.2 g of p-t-butoxystyrene monomer were charged into a 500 ml flask, and 1.6 mmol of sec-butyllithium was further added. After polymerization conducted at −10° C. for 1 hour, the reaction was terminated by adding methanol. Subsequent washing with water and removal of the solvent by distillation provided 8 g of a liquid product. Its GC analysis revealed that it contained 36% of unreacted monomers.

Comparative Example 2

Under a nitrogen atmosphere, 650 ml of dehydrated toluene, 6.5 ml of 1,4-dioxane and 65 g of p-t-butoxystyrene monomers were charged into a 1000 ml flask, and 9.2 mmol of sec-butyllithium was further added. After polymerization conducted at −10° C. for 7 hours, the reaction was terminated by adding methanol. Subsequent washing with water and removal of the solvent by distillation provided 66 g of a product. Its GC analysis revealed that it contained 2.9% of unreacted monomers and that the reaction had proceeded. However, the GPC measurement showed that the product had a number average molecular weight Mn of 9,935 and a large molecular weight distribution Mw/Mn of 1.27. The elution curve demonstrated that the product was not of monodispersion but exhibited a bimodal pattern.

Comparative Example 3

Under a nitrogen atmosphere, 350 ml of dehydrated toluene, 3.5 ml of 1,4-dioxane and 35 g of p-t-butoxystyrene monomers were charged into a 1000 ml flask, and 6.8 mmol of n-butyllithium was further added. After polymerization conducted at −10° C. for 1.5 hours, the reaction was terminated by adding methanol. Subsequent washing with water and removal of the solvent by distillation provided 35 g of a liquid product. Its GC analysis indicated that it contained 21% of unreacted monomers.

Comparative Example 4

Under a nitrogen atmosphere, 170 ml of dehydrated toluene and 3 mmol of sec-butyllithium were charged into a 500 ml flask, and cooled to −50° C. Into the mixture was dropwise added a mixed solution composed of 17 g of p-t-butoxystyrene monomers and 1.7 ml of tetrahydrofuran over 10 minutes, and polymerization was conducted at −50° C. for 2 hours. The reaction was then terminated by adding methanol. Subsequent washing with water and removal of the solvent by distillation provided 17 g of a liquid product. Its GC analysis indicated that it contained 22% of unreacted monomers.

Comparative Example 5

Under a nitrogen atmosphere, 200 ml of dehydrated cyclohexane, 2 ml of tetrahydrofuran and 20 g of p-t-butoxystyrene monomers were charged into a 500 ml flask, and 4.6 mmol of n-butyllithium was further added. After polymerization conducted at 10° C. for 1 hour, the reaction was terminated by adding methanol. Subsequent washing with water and removal of the solvent by distillation provided 19 g of a solid product. Its GC analysis indicated that it contained 11% of unreacted monomers. Its GPC elution curve also demonstrated that it was not of monodispersion.

Comparative Example 6

Under a nitrogen atmosphere, 200 ml of dehydrated toluene, 2 ml of diethyl ether and 20 g of p-t-butoxystyrene monomers were charged into a 500 ml flask, and 4.6 mmol of n-butyllithium was further added. After polymerization conducted at −20° C. for 1 hour, the reaction was terminated by adding methanol. Subsequent washing with water and removal of the solvent by distillation provided 14 g of a liquid product. Its GC analysis indicated that it contained 87% of unreacted monomers.

What is claimed is:

1. A method for producing poly(p-t-butoxystyrene) by polymerizing p-t-butoxystyrene in which an organometallic compound is used as a polymerization initiator and a mixed solvent comprising a hydrocarbon solvent and a diether of (poly)alkylene glycol is used as the polymerization solvent.

2. The method according to claim 1 wherein the diether of (poly)alkylene glycol is a compound represented by the following formula:

$$R^1(OR^2)_nR^3$$

wherein $R_1$ and $R_3$ represent an alkyl group having 1–4 carbon atoms, $R_2$ represents an alkylene group having 2–5 carbon atoms and n represents a number from 1 to 5.

3. The method according to claim 1 wherein the hydrocarbon solvent contains at least one solvent selected form benzene, toluene, xylene, hexane, heptane, cyclohexane and methylcyclohexane.

4. The method according to claim 1 wherein the mixed solvent containing 0.05 to 10% by weight of the diether of (poly)alkylene glycol based on the hydrocarbon solvent.

5. The method according to claim 1 wherein the organometallic compound is an organoalkaline metal.

6. The method according to claim 5 wherein the organoalkaline metal is n-butyllithium or sec-butyllithium.

7. The method according to claim 1 wherein the polymerization reaction is carried out in a high vacuum or under an inert gas atmosphere at a reaction temperature of from −50 to 0° C.

* * * * *